(12) United States Patent
Lu et al.

(10) Patent No.: US 11,740,102 B2
(45) Date of Patent: Aug. 29, 2023

(54) METHOD, APPARATUS, DEVICE AND STORAGE MEDIUM FOR DETERMINING POINT OF INTEREST AREA

(71) Applicant: BEIJING BAIDU NETCOM SCIENCE TECHNOLOGY CO., LTD., Beijing (CN)

(72) Inventors: Xinjiang Lu, Beijing (CN); Yanyan Li, Beijing (CN); Jianguo Duan, Beijing (CN); Hui Xiong, Beijing (CN); Guanglei Du, Beijing (CN)

(73) Assignee: BEIJING BAIDU NETCOM SCIENCE TECHNOLOGY CO., LTD.

( * ) Notice: Subject to any disclaimer, the term of this patent is extended or adjusted under 35 U.S.C. 154(b) by 603 days.

(21) Appl. No.: 16/864,648

(22) Filed: May 1, 2020

(65) Prior Publication Data
US 2021/0108941 A1    Apr. 15, 2021

(30) Foreign Application Priority Data
Oct. 10, 2019    (CN) .......................... 201910959421.X

(51) Int. Cl.
G06F 3/048 (2013.01)
G01C 21/36 (2006.01)
(52) U.S. Cl.
CPC ................. *G01C 21/3682* (2013.01)
(58) Field of Classification Search
None
See application file for complete search history.

(56) References Cited

U.S. PATENT DOCUMENTS 6,295,502 B1 * 9/2001 Hancock ................ H04L 67/52
701/516
8,566,029 B1 * 10/2013 Lopatenko ......... G01C 21/3679
701/538
(Continued)

FOREIGN PATENT DOCUMENTS

CN    103514235 A    1/2014
CN    104834666 A    8/2015
(Continued)

OTHER PUBLICATIONS

Liu, Bin et al.; Learning Geographical Preferences for Point-of-Interest Recommendation, KDD'13, 2013, pp. 1043-1051.
(Continued)

*Primary Examiner* — William C Trapanese
(74) *Attorney, Agent, or Firm* — Dilworth IP, LLC

(57) ABSTRACT

The present disclosure discloses a method, an apparatus, a device, and a storage medium for determining a point of interest area, and relates to the field of automatic driving. The implementation solution is that the method is applied to an electronic device, and includes: receiving a point of interest area determination request input by a first user, the point of interest area determination request including a target area coverage; and acquiring grid data of at least one block within the target area coverage in response to the point of interest area determination request; acquiring, for each block, positioning data of a second user within each preset time period and number of parent points of interest; clustering corresponding grid data according to the positioning data, the grid data and the number of the parent points of interest; determining at least one POI area in each block according to a clustering result.

16 Claims, 10 Drawing Sheets

(56) References Cited

U.S. PATENT DOCUMENTS

| | | |
|---|---|---|
| 2014/0019039 A1 | 1/2014 | Chowanic |
| 2014/0028715 A1 | 1/2014 | Fulks et al. |
| 2019/0360830 A1* | 11/2019 | Chien ................ G06F 16/9024 |

FOREIGN PATENT DOCUMENTS

| | | |
|---|---|---|
| CN | 105403224 A | 3/2016 |
| CN | 105825510 A | 8/2016 |
| CN | 106920387 A | 7/2017 |
| CN | 107025504 A | 8/2017 |
| CN | 107462256 A | 12/2017 |
| CN | 107543553 A | 1/2018 |
| CN | 107562747 A | 1/2018 |
| CN | 108280685 A | 7/2018 |
| CN | 108427965 A | 8/2018 |
| CN | 108763538 A | 11/2018 |
| CN | 109029446 A | 12/2018 |
| CN | 109389119 A | 2/2019 |
| CN | 109947819 A | 6/2019 |
| CN | 110008300 A | 7/2019 |
| CN | 110095133 A | 8/2019 |
| CN | 110267206 A | 9/2019 |
| CN | 110287426 A | 9/2019 |
| CN | 110297967 A | 10/2019 |
| CN | 110309432 A | 10/2019 |

OTHER PUBLICATIONS

Y. Jiang et al., Research on identifying urban regions of different functions based on POI data, Journal of Zhejiang Normal University, vol. 40, No. 4, Nov. 2017, pp. 398-405.

First Office Action in CN Patent Application No. 201910959421.X dated Feb. 2, 2021.

Notice of Allowance in CN Patent Application No. 201910959421.X dated Jul. 2, 2021.

\* cited by examiner

METHOD, APPARATUS, DEVICE AND STORAGE MEDIUM FOR DETERMINING POINT OF INTEREST AREA

CROSS-REFERENCE TO RELATED APPLICATIONS

This application claims priority to Chinese Patent Application No. 201910959421.X, filed on Oct. 10, 2019, which is hereby incorporated by reference in its entirety.

TECHNICAL FIELD

This disclosure relates to the field of image processing technology, and in particular, to intelligent transportation technology.

BACKGROUND

Point of interest (POI for short) is widely used in cartography and navigation systems. In order to meet the needs of being identifiable, a POI usually must include basic information such as name, category, geographical coordinates, and area. The POI area is the area which the POI covers.

In the prior art, the method for determining a POI area is still performed manually. Specifically, this method uses a professional collection vehicle to drive at the preset POI boundary, and the latitude and longitude coordinates of each point during the driving are positioned according to the positioning frequency during the vehicle driving. When the start position and the end position of the vehicle coincide, the latitude and longitude coordinates of the respective points form the boundary line of the POI, and the area surrounded by the boundary line of the POI is the determined POI area.

Therefore, the method for determining a POI area in the prior art has high equipment cost and labor cost. And the efficiency of determining the POI area is low because of the low collection efficiency.

SUMMARY

Embodiments of the present disclosure provide a method, an apparatus, a device, and a storage medium for determining a point of interest area, which solve the problems that the method for determining a POI area in the prior art has high equipment cost and labor cost and the efficiency of determining the POI area is low because of the low collection efficiency.

A first aspect of the embodiments of the present disclosure provides a method for determining a point of interest area, where the method is applied to an electronic device, and the method includes:

receiving a point of interest area determination request input by a first user, where the point of interest area determination request includes a target area coverage; and acquiring grid data of at least one block within the target area coverage in response to the point of interest area determination request; acquiring, for each block, positioning data of a second user within each preset time period and number of parent points of interest; clustering corresponding grid data according to the positioning data, the grid data and the number of the parent points of interest; and determining at least one POI area in each block according to a clustering result.

In the embodiments of the present disclosure, since the grid of each block can be clustered according to the association relationship between the positioning data of the user who is active in the block and the grid, the positioning data of the user can closely associate grids in one POI area, so the grids with close associations together can be clustered, and a corresponding POI area is determined without manual determination, which reduces the cost and improves the efficiency of determining a POI area.

Further, in the method described above, the acquiring grid data of at least one block within the target area coverage includes:

acquiring road data within the target area coverage; generating corresponding road network data according to the road data; determining each polygon in the road network data as each block; performing grid division on the each block to acquire the corresponding grid data.

In the embodiments of the present disclosure, the road data within the target area coverage is acquired, the corresponding road network data is generated according to the road data, the block and the grid data in the block are determined by the road network data. Since the block is generated after the road data is processed, there will be multiple roads around the POI area, so the block surrounded by the road may include at least one POI area to provide data support for determining the POI area subsequently.

Further, the clustering the corresponding grid data according to the positioning data, the grid data and the number of parent points of interest includes:

generating a corresponding positioning contribution relationship graph according to the positioning data and the grid data; determining the number of parent points of interest to be a corresponding number of clustering centers; and clustering the corresponding grid data according to the positioning contribution relationship graph and the number of clustering centers.

In the embodiments of the present disclosure, since the positioning contribution relationship graph can accurately reflect the association relationship between the positioning data of the user who is active in the block and the grid, clustering the corresponding grid data according to the positioning contribution relationship graph and the number of clustering centers can accurately cluster the grids with a close relationship and determine the POI areas corresponding to the number of parent points of interest, which improves the accuracy of determining the POI area.

Further, in the method described above, the generating a corresponding positioning contribution relationship graph according to the positioning data and the grid data includes:

generating nodes of the corresponding positioning contribution relationship graph according to the grid data; determining whether there is an undirected edge between any two nodes according to the positioning data; if there is an undirected edge between two nodes, determining a weight of the undirected edge according to the positioning data; and generating the corresponding positioning contribution relationship graph according to the nodes and the weight of the undirected edge.

In the embodiments of the present disclosure, while generating the corresponding positioning contribution relationship graph according to the positioning data and the grid data, it is determined whether there is an undirected edge between any two nodes according to the positioning data. If there is an undirected edge between the two nodes, the weight of the undirected edge is determined according to the positioning data, so that the generated positioning contribution relationship graph can accurately reflect the association relationship between the positioning data of the user who is active in the block and the grid.

Further, in the method described above, the determining whether there is an undirected edge between any two nodes according to the positioning data includes:

if it is determined according to the positioning data that the second user has successively visited two nodes within a preset time period, determining that there is an undirected edge between the two nodes; if it is determined according to the positioning data that the second user has not visited the two nodes successively in each preset time period, determining that there is no undirected edge between the two nodes.

In the embodiments of the present disclosure, determining whether there is an undirected edge between the two nodes based on whether the second user has successively visited the two nodes in a preset time period in the positioning data can determine that there is a close relationship between the grid data with an undirected edge, and there is no close relationship between grid data without undirected edge.

The determining the weight of the undirected edge according to the positioning data includes:

determining the weight of the undirected edge according to a frequency of successively visiting the two nodes in each preset time period; wherein the frequency has a positive correlation with the weight of the undirected edge.

In the embodiments of the present disclosure, determining the weight of the undirected edge by using the frequency of successively visiting the two nodes in each preset time period can accurately reflect the degree of close association between grid data of the undirected edge according to the weight of the undirected edge.

Further, in the method described above, the clustering the corresponding grid data according to the positioning contribution relationship graph and the number of clustering centers includes:

determining at least one clustering parameter value of each grid data in a preset clustering model according to the positioning contribution relationship graph; filtering out clustering center grid data from the grid data according to the clustering parameter value, where the number of the clustering center grid data is the same as number of the clustering centers; determining a matching relationship value between each grid data and each clustering center grid data; and determining a category of each grid data according to the matching relationship value.

In the embodiments of the present disclosure, the positioning contribution relationship graph is incorporated into the calculation of the clustering parameter value, so that the calculated clustering parameter value can truly reflect the association relationship between the user's positioning data and the grid. After clustering the grids according to the clustering parameter value of the grid data and clustering center grid data, the grids with close association relationship can be clustered together to form grid clusters of the same category as the clustering center grid data, thereby determining the corresponding POI area.

Further, in the method described above, the preset clustering model is a density peak clustering model;

the determining at least one clustering parameter value of each grid data in a preset clustering model according to the positioning contribution relationship graph includes:

determining a first clustering parameter value of grid data of a starting point of the undirected edge according to the weight of the undirected edge in the positioning contribution relationship graph and a distance between the two nodes corresponding to the undirected edge; and according to a distance between each node and a corresponding preset high-density node in the positioning contribution relationship graph, determining a second clustering parameter value of grid data corresponding to the node.

In the embodiments of the present disclosure, since the density peak clustering model can cluster irregular clusters, and the POI area is also irregular, it is more suitable for determining the POI area, and the positioning contribution relationship graph is incorporated in the calculation of the clustering parameter value of the density peak clustering model, so that the calculated clustering parameter values can truly reflect the association relationship between the users positioning data and the grid.

Further, in the method described above, the filtering out clustering center grid data from the grid data according to the clustering parameter value includes:

ranking the grid data according to the first clustering parameter value and the second clustering parameter value respectively; acquiring first M grid data whose the first clustering parameter value and the second clustering parameter value are both ranked in the first M; filtering out N grid data from the first M grid data according to a product value of the first cluster parameter value and the second cluster parameter value; and determining the N grid data to be the clustering center grid data.

In the embodiments of the present disclosure, since the first M grid data whose the first clustering parameter value and the second clustering parameter value are both ranked in the first M are selected first, then N grid data are filtered out from the first M grid data according to the product value of the first cluster parameter value and the second cluster parameter value, so that the density of the selected clustering center grid data is greater than the density of surrounding neighbor grid data; and the distance between the clustering center grid data and high-density grid data is relatively large, so that the selected clustering center grid data is more suitable for the density peak clustering model.

Further, in the method described above, the matching relationship value is a weight of a corresponding undirected edge;

the determining the category of each grid data according to the matching relationship value includes:

determining a category of the clustering center grid data corresponding to a largest weight of the undirected edge to be the category of the grid data.

In the embodiments of the present disclosure, the category of the clustering center grid data corresponding to the weight of the largest undirected edge is determined to be the category of the grid data, since the weight of the undirected edge reflects the degree of close association relationship of the grid data and the clustering center grid data, the category of the most closely associated clustering center grid data is determined to be the category of the grid data, so that the determined category of the grid data is more accurate.

Further, in the method described above, the determining at least one POI area in each block according to a clustering result includes:

determining the area where the grid data of each category in each block is located to be the POI area of the corresponding category.

Further, after determining at least one POI area in each block according to the clustering result, the method further includes:

verifying the clustering result according to a parent point of interest and a child point of interest included in the POI area.

In the embodiments of the present disclosure, the clustering result is verified according to the parent point of interest and the child point of interest included in the POI area, and whether the clustered POI area is accurate can be determined.

Further, in the embodiment of the present disclosure, after determining at least one POI area in each block according to the clustering result, the method further includes:

smoothing a boundary of the POI area.

In the embodiments of the present disclosure, smoothing the boundary of the POI area can eliminate the sawtooth phenomenon at the boundary of the POI area.

Further, in the method described above, after verifying the clustering result according to the parent point of interest and the child point of interest included in the POI area, the method further includes:

if the clustering result passes the verification, outputting at least one POI area in each block; and displaying each POI area with a corresponding display strategy.

In the embodiments of the present disclosure, after at least one POI area in a block is determined, displaying each POI area with a corresponding display strategy can display adjacent POI areas distinguishingly. It is more convenient for users to check the determined POI area.

A second aspect of the embodiments of the present disclosure provides an apparatus for determining a point of interest area, where the apparatus is in an electronic device, and the apparatus includes:

a request receiving module, configured to receive a point of interest area determination request input by a first user, where the point of interest area determination request includes a target area coverage; a grid data acquiring module, configured to acquire grid data of at least one block within the target area coverage in response to the point of interest area determination request; a block clustering module, configured to acquire, for each block, positioning data of a second user within each preset time period and a number of parent points of interest, and cluster corresponding grid data according to the positioning data, the grid data and the number of the parent points of interest; a POI area determining module, configured to determine at least one POI area in each block according to a clustering result.

Further, in the apparatus described above, the grid data acquiring module, while acquiring grid data of at least one block within the target area coverage, is specifically configured to acquire road data within the target area; generate corresponding road network data according to the road data; determine each polygon in the road network data as each block; and perform grid division on the each block to acquire the corresponding grid data.

Further, in the apparatus described above, the block clustering module, while clustering the corresponding grid data according to the positioning data, the grid data and the number of parent points of interest, is specifically configured to generate a corresponding positioning contribution relationship graph according to the positioning data and the grid data; determine the number of parent points of interest to be a corresponding number of clustering centers; and cluster the corresponding grid data according to the positioning contribution relationship graph and the number of clustering centers.

Further, in the apparatus described above, the block clustering module, while generating a corresponding positioning contribution relationship graph according to the positioning data and the grid data, is specifically configured to generate nodes of the corresponding positioning contribution relationship graph according to the grid data; determine whether there is an undirected edge between any two nodes according to the positioning data; if there is an undirected edge between two nodes, determine a weight of the undirected edge according to the positioning data; and generate the corresponding positioning contribution relationship graph according to the nodes and the weight of the undirected edge.

Further, in the apparatus described above, the block clustering module, while determining whether there is an undirected edge between any two nodes according to the positioning data, is specifically to, if it is determined according to the positioning data that the second user has successively visited two nodes within a preset time period, determine that there is an undirected edge between the two nodes; if it is determined according to the positioning data that the second user has not visited the two nodes successively in each preset time period, determine that there is no undirected edge between the two nodes.

Furthermore, in the apparatus described above, the block clustering module, while determining the weight of the undirected edge according to the positioning data, is specifically configured to determine the weight of the undirected edge according to a frequency of successively visiting the two nodes in each preset time period; wherein the frequency has a positive correlation with the weight of the undirected edge.

Further, in the apparatus described above, the block clustering module, while clustering the corresponding grid data according to the positioning contribution relationship graph and the number of clustering centers, is specifically configured to determine at least one clustering parameter value of each grid data in a preset clustering model according to the positioning contribution relationship graph; filter out clustering center grid data from the grid data according to the clustering parameter value, the number of the grid center grid data is the same as number of the clustering centers; determine a matching relationship value between each grid data and each clustering center grid data; and determine a category of each grid data according to the matching relationship value.

Further, in the apparatus described above, the preset clustering model is a density peak clustering model. Correspondingly, the block clustering module, while determining at least one clustering parameter value of each grid data in a preset clustering model according to the positioning contribution relationship graph, is specifically configured to determine a first clustering parameter value of grid data of a starting point of the undirected edge according to the weight of the undirected edge in the positioning contribution relationship graph and a distance between the two nodes corresponding to the undirected edge; according to a distance between each node and a corresponding preset high-density node in the positioning contribution relationship graph, determine a second clustering parameter value of grid data corresponding to the node.

Further, in the apparatus described above, the block clustering module, when filtering out clustering center grid data from the grid data according to the clustering parameter value, is specifically configured to rank the grid data according to the first clustering parameter value and the second clustering parameter value respectively; acquire the first M grid data whose the first clustering parameter value and the second clustering parameter value are both ranked in the first M; filter out N grid data from the first M grid data according to a product value of the first cluster parameter value and the second cluster parameter value; and determine the N grid data to be the clustering center grid data.

Further, in the apparatus described above, the matching relationship value is a weight of a corresponding undirected edge. The block clustering module, while determining the category of each grid data according to the matching relationship value, is specifically configured to determine a category of the clustering center grid data corresponding to a weight of a largest undirected edge to be the category of the grid data.

Further, in the apparatus described above, the POI area determining module, is specifically configured to determine the area where the grid data of each category in each block is located to be the POI area of the corresponding category.

Further, the apparatus described above further includes: a smoothing processing module, configured to smooth a boundary of the POI area.

Further, the apparatus described above further includes: a result verifying module, configured to verify the clustering result according to a parent point of interest and a child point of interest included in the POI area.

Further, the apparatus described above further includes: a displaying module, configured to output at least one POI area in each block if the clustering result passes the verification; and display each POI area with a corresponding display strategy.

A third aspect of the embodiments of the present disclosure provides an electronic device, including: at least one processor; and a memory communicatively connected to the at least one processor; wherein, the memory stores instructions executable by the at least one processor, and the instructions are executed by the at least one processor to enable the at least one processor to execute the method of any one of the first aspect.

A fourth aspect of the embodiments of the present disclosure provides a non-transitory computer-readable storage medium storing computer instructions, where the computer instructions are configured to cause a computer to execute the method according to any one of the first aspect.

A fifth aspect of the embodiments of the present disclosure provides a method for determining a point of interest area, including:

acquiring grid data of at least one block within a target area coverage; acquiring, for each block, positioning data of a second user within each preset time period and a number of parent points of interest; clustering corresponding grid data according to the positioning data, the grid data and the number of the parent points of interest; and determining at least one POI area in each block according to a clustering result.

A sixth aspect of the embodiments of the present disclosure provides a computer program including program code, and when a computer runs the computer program, the program code executes the method according to the first aspect.

BRIEF DESCRIPTION OF THE DRAWINGS

The drawings are used to better understand this solution, and do not constitute a limitation on the present disclosure. Among them.

DETAILED DESCRIPTION OF THE EMBODIMENTS

Exemplary embodiments of the present disclosure are described below with reference to the accompanying drawings, which include various details of the embodiments of the present disclosure to facilitate understanding, and they should be considered as merely exemplary. Therefore, those of ordinary skill in the art should recognize that various changes and modifications can be made to the embodiments described herein without departing from the scope and spirit of the disclosure. Also, for clarity and conciseness, descriptions of well-known functions and structures are omitted in the following description.

In order to clearly understand the technical solutions of the present disclosure, the terms and algorithms involved in the embodiments of the present disclosure will be explained first:

Point of interest (POI): POI refers to a certain landmark or scenic spot on an electronic map, which is used to indicate the administrative department, business institution, tourist attraction, place of interest, and transportation facility represented by this place. POI usually must include basic information such as name, category, geographic coordinates, area, etc.

Density peak clustering model: the core idea of clustering of the density peak clustering model (DPCA for short) is to find high-density areas separated by low-density areas. The density peak clustering model is based on the assumption that firstly, the density of the clustering center point is greater than the density of the surrounding neighbor points; secondly, the distance between the clustering center point and the high-density point is relatively large. Therefore, the density peak clustering model mainly has two clustering parameters that need to be calculated: the first parameter is the local density of the target point; and the second one is the distance between the target point and the high-density point.

Figure 1:
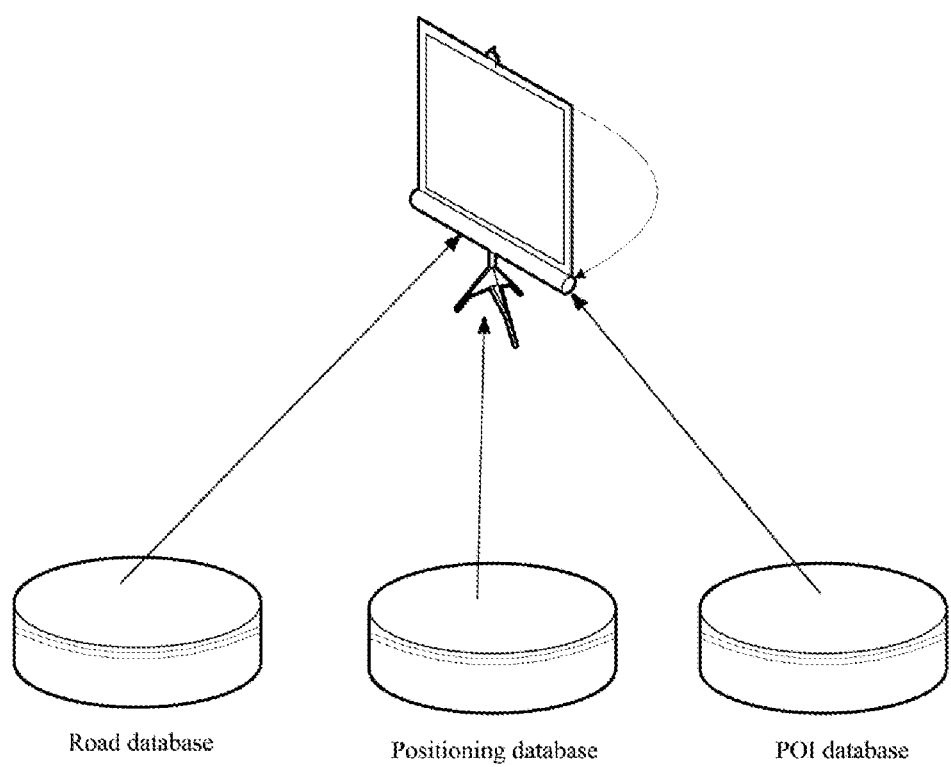
FIG. 1 is a scene diagram that can implement the method for determining a point of interest area according to an embodiment of the present disclosure.

The implementation scenario of the method for determining a point of interest area provided by the embodiments of the present disclosure will be described in the following. As shown in FIG. 1, an implementation scenario corresponding to the method for determining a point of interest area provided by the embodiment of the present disclosure includes at least one database and an electronic device. The electronic device is communicatively connected with at least one database to acquire data. The at least one database may include a POI database storing POI data in the electronic map, a road database storing road data in the electronic map, and a positioning database storing positioning data of the second user. Among them, the POI data corresponding to each block can be acquired in the POI database, including the name and number of parent points of interest corresponding to each block, and the name and number of child points of interest corresponding to each parent point of interest. The positioning data of the second user in each preset time period in each block can be acquired in the positioning database. From the road database, road data of a preset level in the electronic map can be acquired. It can be understood that these databases can also be integrated together and stored in electronic devices. Specifically, when the method for determining a point of interest area in the embodiment of the present disclosure is performed, road data of a target area is acquired from the road database, and at least one block and grid data of at least one block is acquired after the road data is processed, i.e. corresponding grid data is acquired according to road data. According to the identification information of each block, the positioning data of the second user in each block in each preset time period can be acquired from the positioning database. The number of parent points of interest in each block is acquired from the POI database according to the identification information of each block. After the grid data of each block, the corresponding positioning data and the number of parent points of interest are acquired, for each block, the corresponding grid data is clustered according to the positioning data, the grid data and the number of parent points of interest, and at least one POI area in each block is determined according to the clustering result. Among them, each POI area is a relatively independent functional area. For example, the POI area can be an office building, a residential area, a shopping mall, and so on. Since most of the second user's positioning data will only appear in one independent functional area in a relatively short time, if the block is grid divided, the grids in one independent functional area can be closely associated through the positioning data of the second user active in the block, but the grids in different independent functional areas are not closely associated, and the number of parent point of interest in one POI area is one. Therefore, by clustering through the user's positioning data and the association relationship of the grids, grid clusters in the block which have the same number as that of parent points of interest and close association relationship can be obtained, and the area where each grid cluster is located can be used as one POI area. The method for determining a point of interest area in the embodiment of the present disclosure can determine a POI area by using an association relationship between data without manual determination, thereby reducing costs and improving the efficiency of determining a POI area.

Hereinafter, embodiments of the present disclosure will be described in detail with reference to the drawings.

First Embodiment

Figure 2:
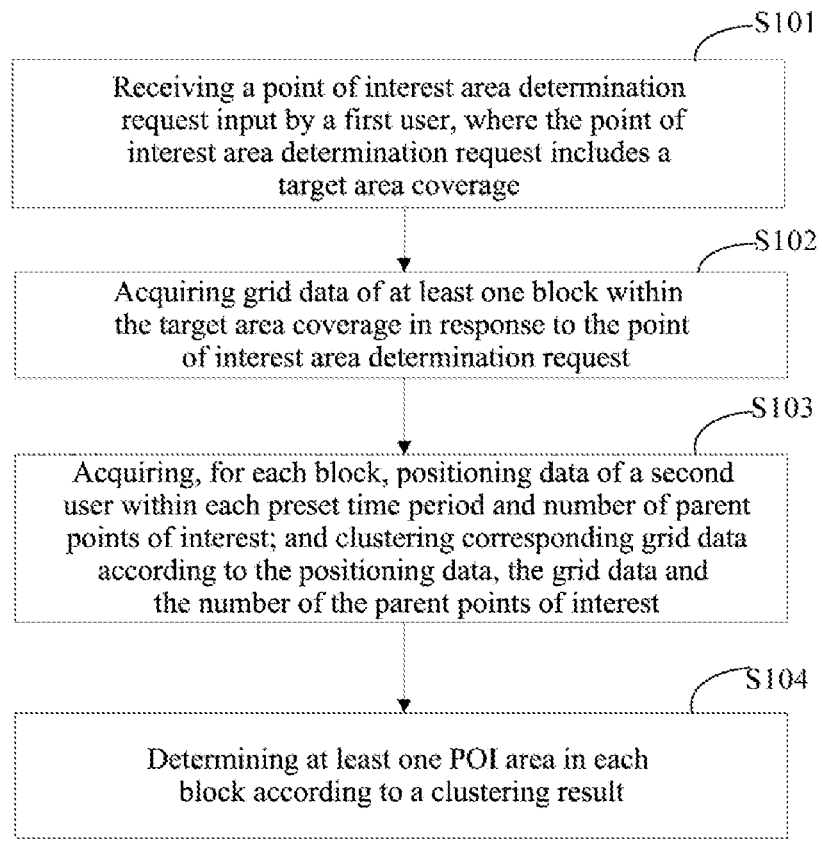
FIG. 2 is a schematic flowchart of a method for determining a point of interest area according to a first embodiment of the present disclosure.

FIG. 2 is a schematic flowchart of a method for determining a point of interest area according to a first embodiment of the present disclosure. As shown in FIG. 2, the execution subject of the embodiment of the present disclosure is an apparatus for determining a point of interest area, which can be integrated in an electronic device. The method for determining a point of interest area provided by this embodiment includes the following steps.

Step 101: receiving a point of interest area determination request input by a first user, where the point of interest area determination request includes a target area coverage.

Wherein, the first user is a user determining the point of interest area.

In this embodiment, the target area coverage is an area coverage to be processed for determining at least one POI area is determined. For example, it can be a certain country, a certain province or city, or a certain district of a city.

Specifically, in this embodiment, the electronic device may provide a client or a webpage that determines a point of interest area. The client or the webpage may include an input or selection operation item for the target area coverage. After the target area coverage is input or selected through the operation item, the point of interest area determination request can be sent by clicking a sending request operation item. The first electronic device receives the point of interest area determination request. The point of interest area determination request includes the target area coverage.

Step 102: acquiring grid data of at least one block within the target area coverage in response to the point of interest area determination request.

Specifically, in this embodiment, the electronic device extracts the target area coverage in the point of interest area determination request, and electronic map road data corresponding to the target area coverage can be obtained from the road database. The road data is processed to form grid data of at least one block.

Wherein, each block may be a polygon, and the grid data within the polygon may be grid data that divides the polygon into rectangles uniformly.

It should be noted that, since the block is generated after the road data is processed, there will be multiple roads around the POI area, so the block surrounded by the road may include at least one POI area.

Step 103: acquiring, for each block, positioning data of a second user within each preset time period and number of parent points of interest; and clustering corresponding grid data according to the positioning data, the grid data and the number of the parent points of interest.

It can be understood that, in this embodiment, for each block, the POI area within this each block is determined. Therefore, in this embodiment, the following processing may be performed for each block:

firstly, the positioning data of the second user of the block in each preset time period can be acquired from the positioning database. The second user is a user who is active in the block. There are a plurality of second users, and a plurality of second users constitute a user set. Specifically, the positioning module of the terminal device of each second user in the user set may be used to position the second user. When specifically positioning the second user, a time period is set in advance, and the time period is a relatively short time period, such as half an hour, one hour, or the like. Then, the positioning data of the second user in the block within each preset time period can be counted for one day, one week or more. The positioning data may be grid data in the block that the second user passes, or may be a positioning trajectory of the second user and the like.

Secondly, the number of parent points of interest in the block can be acquired from the POI database. Specifically, first, the electronic device matches the block with the electronic map, determines the area enclosed by the block in the electronic map, and sends area information of the enclosed area to the POI database to acquire the number of parent points of interest in the enclosed area from the POI database.

Among them, the number of parent points of interest is the same as the number of POI areas. That is, only one parent point of interest is included in one POI area. It can be understood that at least one child point of interest may be included in one POI area.

Finally, the corresponding grid data is clustered according to the acquired positioning data, the corresponding grid data and the number of parent points of interest. Most of the positioning data of the second user will only appear in one POI area in a relatively short time. Thus, when the block is grid divided, the grids in one POI area can be closely associated through the user's positioning data, but the grids in different POI areas are not closely associated, and the number of parent point of interest in each one POI area is all one. Therefore, by clustering through the association relationship between the user's positioning data and the grids, grid clusters in the block which have the same number as that of parent points of interest and close association relationship can be obtained, and the area where each grid cluster is located can be used as one POI area.

Step 104: determining at least one POI area in each block according to a clustering result.

Specifically, in this embodiment, the clustering result has formed grid clusters with the same number of parent points of interest. The area where each grid cluster is located can be determined as the corresponding POI area, and the boundary of each grid cluster is determined as the boundary of the POI area.

The method for determining a point of interest area provided by this embodiment receives a point of interest area determination request input by a first user, where the point of interest area determination request includes a target area coverage; and acquires grid data of at least one block within the target area coverage in response to the point of interest area determination request; acquires, for each block, positioning data of a second user within each preset time period and the number of parent points of interest; clustering corresponding grid data according to the positioning data, the grid data and the number of the parent points of interest; and determining at least one POI area in each block according to a clustering result. Since the grids of each block can be clustered according to the association relationship between the positioning data of the user who is active in the block and the grids, the positioning data of the user can closely associate grids in one POI area, and the grids with close associations together can be clustered to determine a corresponding POI area without manual determination, which reduces the cost and improves the efficiency of determining a POI area.

Second Embodiment

Figure 3:
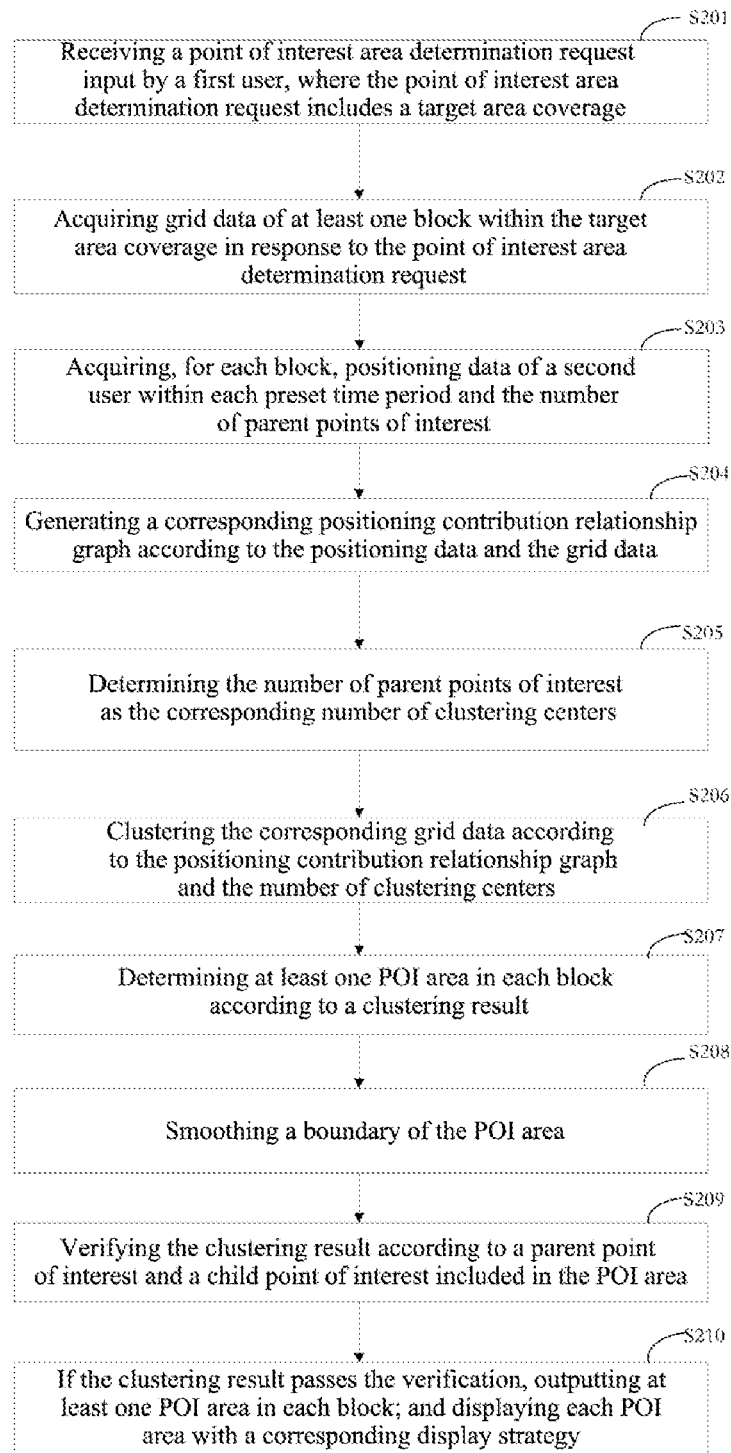
FIG. 3 is a schematic flowchart of a method for determining a point of interest area according to a second embodiment of the present disclosure.

FIG. 3 is a schematic flowchart of a method for determining a point of interest area according to a second embodiment of the present disclosure. As shown in FIG. 3, the method for determining a point of interest area according to in this embodiment is based on the method for determining the point of interest area according to Example I of the present disclosure, and further refines steps 102-104. And a post-processing step of the POI area is also included. The method for determining a point of interest area according to this embodiment includes the following steps.

Step 201: receiving a point of interest area determination request input by a first user, where the point of interest area determination request includes a target area coverage.

In this embodiment, the implementation of step 201 is the same as the implementation of step 101 in the first embodiment of the present disclosure, and details are not described herein again.

Step 202: acquiring grid data of at least one block within the target area coverage in response to the point of interest area determination request.

Figure 4:
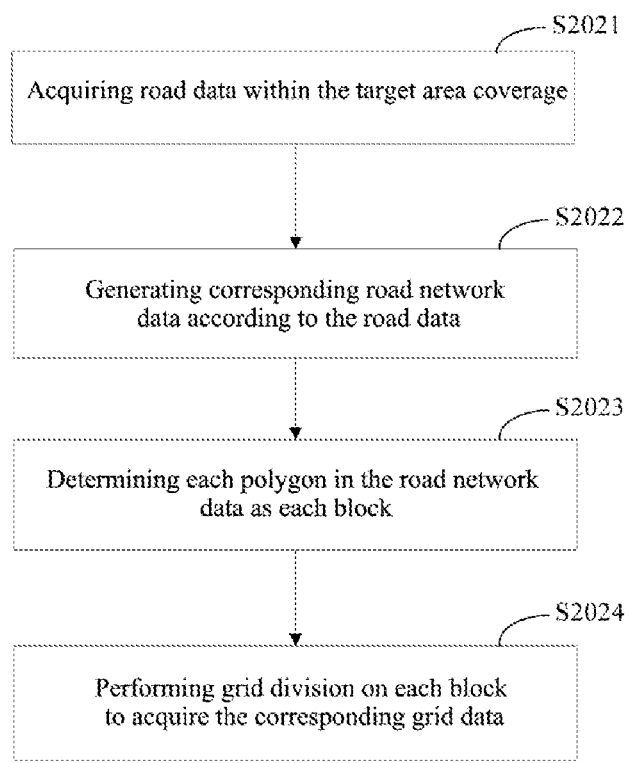
FIG. 4 is a schematic flowchart of step 202 of the method for determining a point of interest area according to the second embodiment of the present disclosure.

Further, as shown in FIG. 4, in this embodiment, step 202 includes the following steps.

Step 2021: acquiring road data within the target area coverage.

Further, in this embodiment, the acquired road data within the target area coverage may include road data of a preset level, such as road data of level 7, road data of level 5.

Step 2022: generating corresponding road network data according to the road data.

Further, in this embodiment, corresponding road network data is generated from the road data, and the road network data includes a plurality of irregular polygons.

Figure 5:
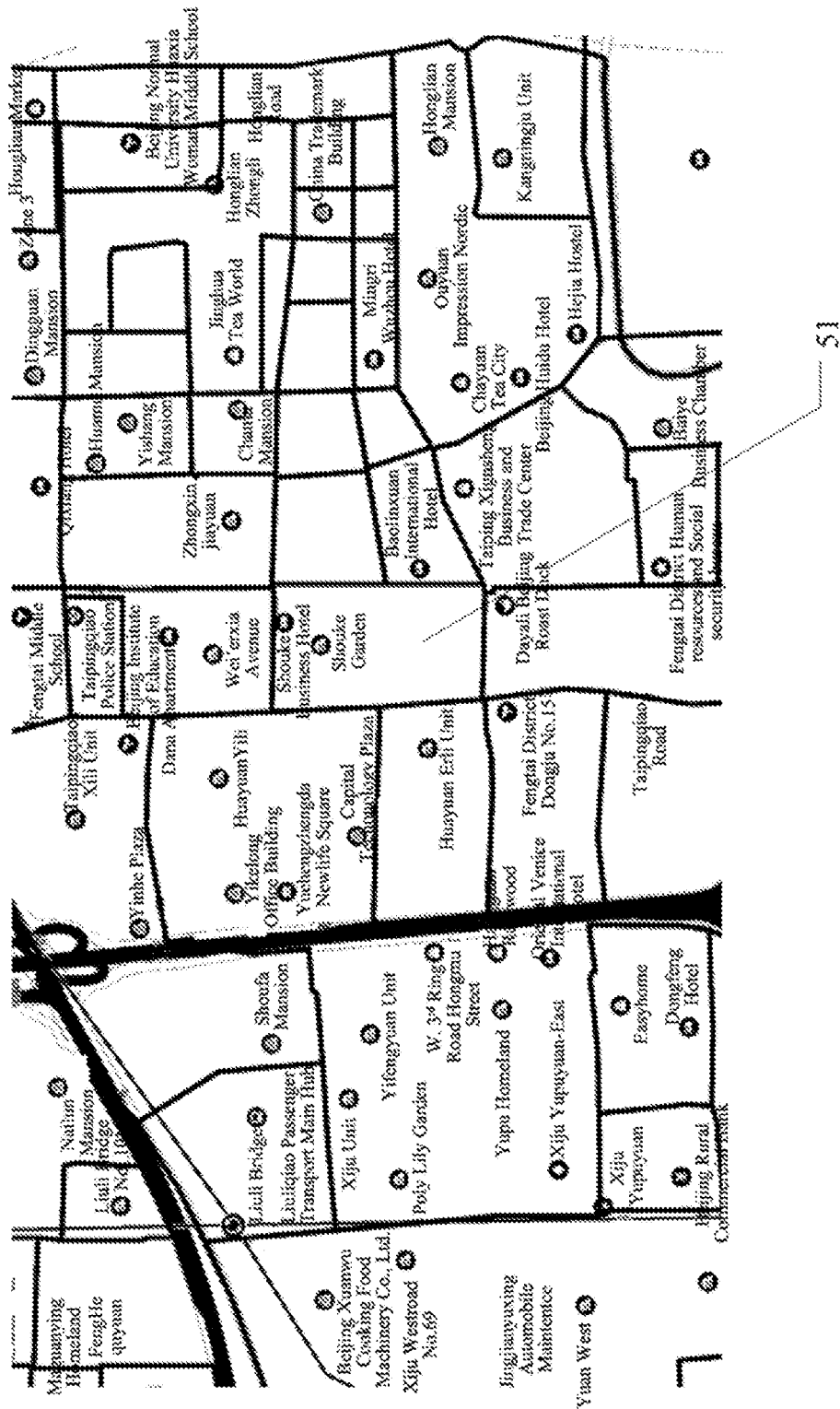
FIG. 5 is a schematic diagram of road network data in the method for determining a point of interest area according to the second embodiment of the present disclosure.

The method for generating corresponding road network data from road data may be: acquiring an intersection of the first road and other roads after the first road reaches an end point from a starting point, and then determining a next road in a clockwise or counterclockwise direction, and finding the intersection of the next road and other roads, and so on, until the latitude and longitude coordinates of the end point of the last road are consistent with the latitude and longitude coordinates of the starting point of the first road. According to this method, a polygon of road network data can be determined. As shown in FIG. 5, the target area coverage in the electronic map is an area coverage in a certain district of Beijing. The road network data generated within the target area coverage includes a plurality of polygons 51.

Step 2023: determining each polygon in the road network data as each block.

Step 2024: performing grid division on each block to acquire the corresponding grid data.

Further, in this embodiment, each block is grid divided uniformly, and each grid may be rectangular. Corresponding grid data can be constructed from the position coordinates of each grid.

In this embodiment, the road data within the target area coverage is acquired, and the corresponding road network data is generated according to the road data, the block is determined according to the road network data and the grid data in the block is determined. Since the blocks are generated from the processed road data, there will be multiple roads around the POI area, so the block surrounded by the roads may include at least one POI area to provide data support for determining the POI area subsequently.

Step 203: acquiring, for each block, positioning data of a second user within each preset time period and the number of parent points of interest.

In this embodiment, the implementation of step 203 is similar to the implementation of the corresponding part in step 103 in the first embodiment of the present disclosure, and details are not repeated here.

Step 204: generating a corresponding positioning contribution relationship graph according to the positioning data and the grid data.

Further, in this embodiment, in order to establish an association relationship between the positioning data of the second user and the grids, a corresponding positioning contribution relationship graph is generated according to the positioning data and the grid data.

Figure 6:
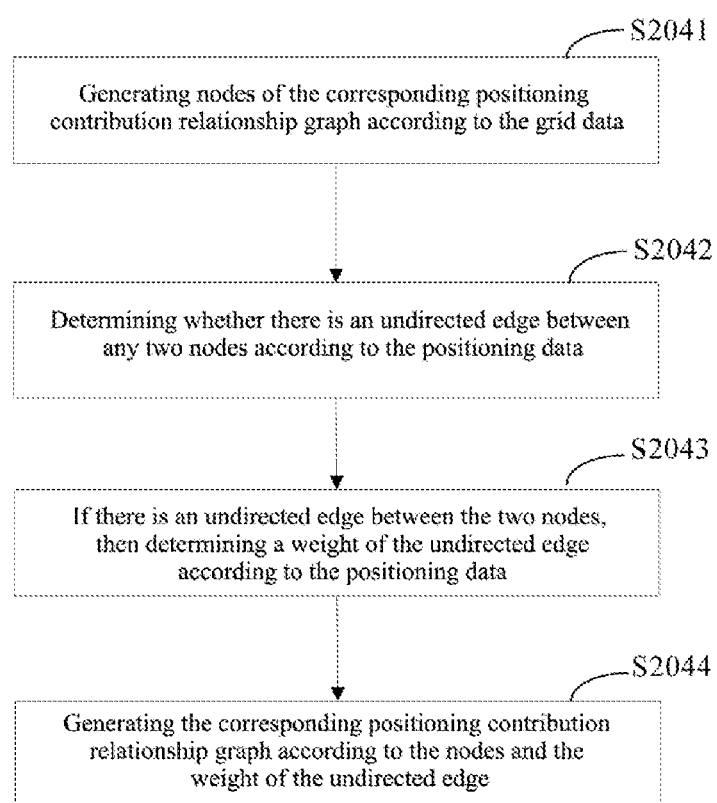
FIG. 6 is a schematic flowchart of step 204 of the method for determining a point of interest area according to the second embodiment of the present disclosure.

In this embodiment, as shown in FIG. 6, step 204 includes the following steps:

Step 2041: generating nodes of the corresponding positioning contribution relationship graph according to the grid data.

In this embodiment, the positioning contribution relationship graph is an undirected graph, which includes nodes and undirected edges formed by the nodes. Each grid data in the block can be determined to be the corresponding node of the positioning contribution relationship graph.

Step 2042: determining whether there is an undirected edge between any two nodes according to the positioning data.

In this embodiment, determining whether there is an undirected edge between any two nodes according to the positioning data includes:

if it is determined according to the positioning data that the second user has successively visited two nodes within a preset time period, determining that there is an undirected edge between the two nodes; if it is determined according to the positioning data that the second user has not visited the two nodes successively in each preset time period, determining that there is no undirected edge between the two nodes.

Wherein, the second user is a user who is active in the block. There are a plurality of second users, and the plurality of second users constitute a user set.

Specifically, in this embodiment, any two nodes in the positioning contribution relationship graph are traversed to perform the following operations: acquiring positioning data of the second user in each preset time period, and judging, according to the positioning data, whether two nodes have been visited in each preset time period. If it is determined that the second user has visited successively two nodes in a certain one or more preset time periods, determining that there is an undirected edge between the two nodes; if it is determined that the second user has not visited two nodes successively in each preset time period, determining that there is no undirected edge between the two nodes.

Step 2043, if there is an undirected edge between the two nodes, then determining a weight of the undirected edge according to the positioning data.

Further, in this embodiment, the determining a weight of the undirected edge according to the positioning data includes:

determining the weight of the undirected edge according to the frequency of successively visiting the two nodes in each preset time period;

wherein the frequency has a positive correlation with the weight of the undirected edge.

Specifically, in this embodiment, since the grids of one POI area can be closely associated by the positioning data of the second user, if the frequency of successively visiting the two nodes in each preset time period is greater, the weight of the undirected edge is greater, and the similarity of the grids represented by these two nodes is higher, and the association of the grids represented by the two nodes is closer.

As an implementation, in this embodiment, the weight of the undirected edge is expressed as shown in formula (1):

$$w(e) = \sum_{u \in U}^{|Tr|} \sum_{m=1} \frac{1}{m} \quad (1)$$

Among them, w(e) represents the weight of the undirected edge, U represents the user set, the user set includes a plurality of second users, and Tr represents a record sequence of the behavior trajectories of two nodes of the undirected edge visited successively by the second user in all preset time periods. m is the element in the set of the lengths of all subsequences in the sequence, that is, the value of m is from 1 to |Tr|.

Step 2044: generating a corresponding positioning contribution relationship graph according to the nodes and the weight of the undirected edge.

In this embodiment, the positioning contribution relationship graph includes nodes of the same number as the grid data in the block, and multiple undirected edges and weights of undirected edges.

Step 205: determining the number of parent points of interest as the corresponding number of clustering centers.

In this embodiment, the number of POI areas in the block is the same as the number of parent points of interest in the block, and the number of clustering centers is the same as the number of classified POI areas. Therefore, in order to obtain each POI area in the block, the number of parent points of interest is determined to be the corresponding number of clustering centers.

Step 206, clustering the corresponding grid data according to the positioning contribution relationship graph and the number of clustering centers.

Figure 7:
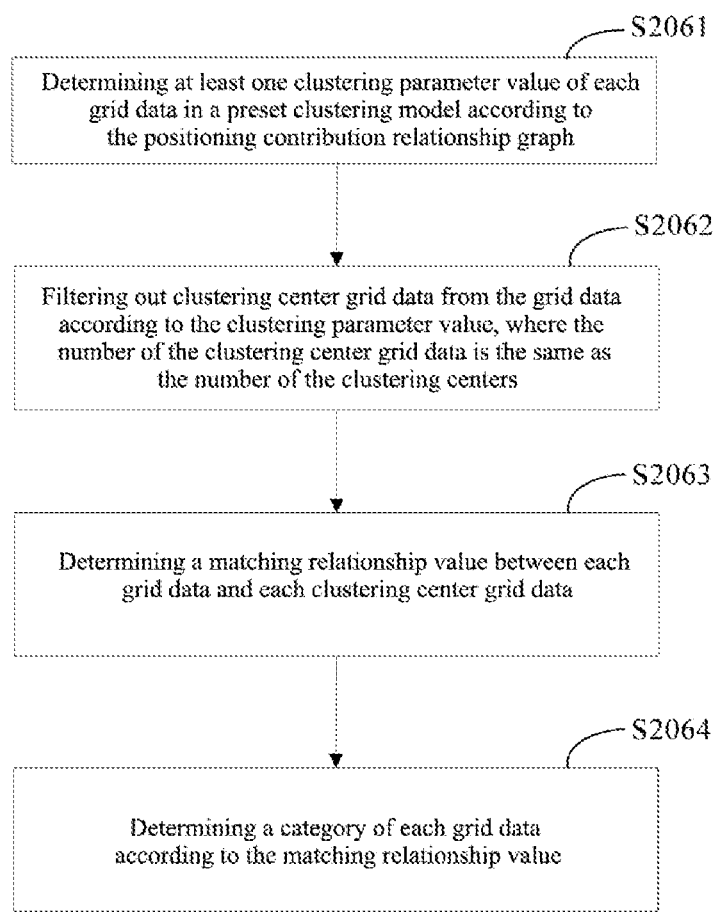
FIG. 7 is a schematic flowchart of step 206 of the method for determining a point of interest area according to the second embodiment of the present disclosure.

Further, as shown in FIG. 7, in this embodiment, step 206 includes the following steps:

Step 2061: determining at least one clustering parameter value of each grid data in a preset clustering model according to the positioning contribution relationship graph.

Further, in this embodiment, since the density peak clustering model can cluster irregular clusters, and the POI area is also irregular, it is more suitable for determining the POI area. Therefore, in this embodiment, the preset clustering model is a density peak clustering model. The clustering parameters included in the peak density clustering model are: local density and the distance between the grid data and the high-density grid data.

Therefore, as an implementation, in this embodiment, determining at least one clustering parameter value of each grid data in a preset clustering model according to the positioning contribution relationship graph includes:

firstly, determining a first clustering parameter value of grid data of a starting point of the undirected edge according to the weight of the undirected edge in the positioning contribution relationship graph and the distance between two nodes corresponding to the undirected edge.

The first clustering parameter value is a local density value.

Specifically, in this embodiment, the first clustering parameter value of the grid data of the starting point of the undirected edge can be expressed as shown in formula (2):

$$\rho_i = \sum_j \exp\left(\frac{-1}{2\sigma^2 s_{ij}^2 + 1}\right) \frac{1}{d_{ij}^{1/\gamma}} \quad (2)$$

Among them, $\rho_i$ represents the local density value of the grid data at the starting point of the undirected edge, and j represents the end point of the undirected edge with i as the starting point. $s_{ij}$ represents a similarity between node i and node j. Among them, $s_{ij}=w_{ij}$, $w_{ij}$ represents the weight of the undirected edge formed by node i and node j, and $d_{ij}$ represents the distance between node i and node j, and this distance is Euclidean distance. $\gamma$ is a constant greater than 1, and $\sigma$ is the sample variance, which is also a constant.

In this embodiment, the smaller $w_{ij}$, the smaller the contribution of the node j to the local density value of the node i, and conversely, the larger $w_{ij}$, the greater the contribution of the node j to the local density value of the node i. At the same time, the larger $d_{ij}$, the smaller the contribution of the node j to the local density value of the node i, and conversely, the smaller $d_{ij}$, the greater the contribution of the node j to the local density value of the node i.

Secondly, determining a second clustering parameter value of grid data corresponding to the node according to a distance between each node and a corresponding preset high-density node in the positioning contribution relationship graph.

The second clustering parameter value is a distance between the grid data corresponding to the node and the high-density grid data.

In this embodiment, according to the local density value of each node, multiple nodes with higher the local density values than the node around each node can be determined, and from these nodes with higher local density values, the node having the closest distance to the node is determined to be the preset high-density node of the node.

In this embodiment, the second clustering parameter value corresponding to the grid data of node i can be expressed as shown in formula (3):

$$\min_{\rho_{j'} > \rho_i} d_{ij'} \quad (3)$$

Among them, $d_{ij'}$ represents the distance between the node i and the surrounding node j' with a high local density value corresponding to the node i.

$$\min_{\rho_{j'} > \rho_i} d_{ij'}$$

represents the distance value between the node i and the preset high-density node, that is, the distance between the grid data corresponding to the node and the high-density grid data.

Step 2062, filtering out clustering center grid data from the grid data according to the clustering parameter value, where the number of the clustering center grid data is the same as the number of the clustering centers.

In this embodiment, the grid data is ranked according to the size of the first clustering parameter value and the second clustering parameter value, and the first N grid data whose the first clustering parameter value and the second clustering parameter value are both greater are filtered out as the clustering center grid data. Among them, N is the number of clustering center grid data, and also the number of clustering centers.

Figure 8:
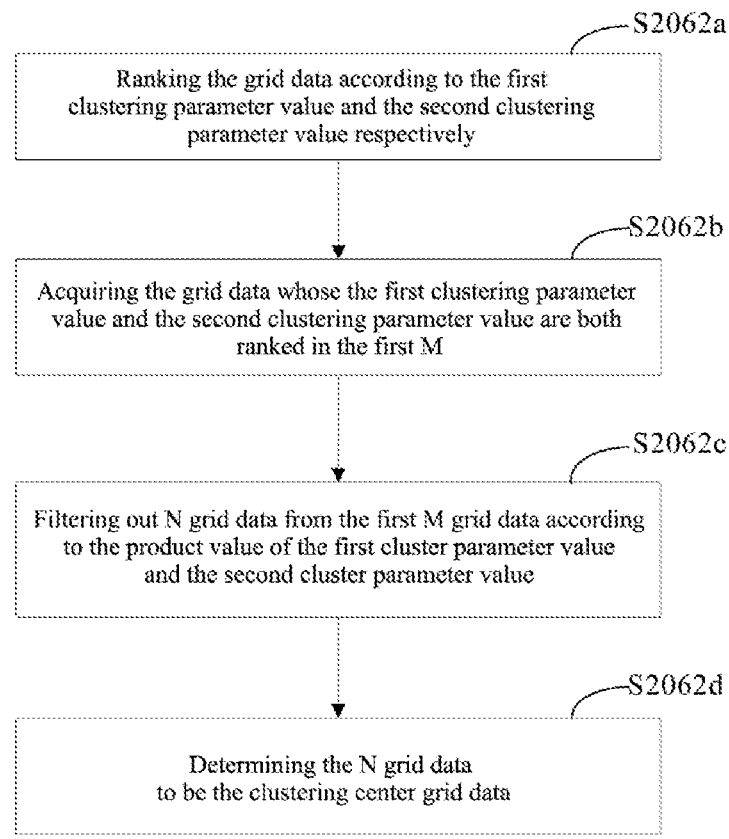
FIG. 8 is a schematic flowchart of step 2062 of the method for determining a point of interest area according to the second embodiment of the present disclosure.

As an implementation, in this embodiment, as shown in FIG. 8, step 2062 includes the following steps:

Step 2062a, ranking the grid data according to the first clustering parameter value and the second clustering parameter value respectively.

Step 2062b, acquiring first M grid data whose the first clustering parameter value and the second clustering parameter value are both ranked in the first M.

In this embodiment, the density of the clustering center grid data is greater than the density of the surrounding neighbor grid data; and the distance between the clustering center grid data and the high-density grid data is relatively large. Therefore, in this embodiment, M grid data with relatively large local density values and relatively large distance from corresponding high-density grid data are selected first.

Step 2062c, filtering out N grid data from the first M grid data according to the product value of the first cluster parameter value and the second cluster parameter value.

Step 2062d: determining the N grid data to be the clustering center grid data.

Among them, N is also the number of the clustering center grid data.

Further, in this embodiment, product values of the first cluster parameter values and the second cluster parameter values of the first M grid data may be calculated, and the first M grid data may be ranked according to the product values from large to small, and the grid data with the top N product values are acquired as the clustering center grid data.

Step 2063: determining a matching relationship value between each grid data and each clustering center grid data.

Further, in this embodiment, the matching relationship value is a weight of a corresponding undirected edge.

In this embodiment, since the weight of the undirected edge between each grid data and each clustering center grid data represents the similarity between each grid data and each clustering center grid data, the weight of the undirected edge between each grid data and each clustering center grid data can be used to represent the matching relationship value between each grid data and each clustering center grid data.

Step 2064: determining a category of each grid data according to the matching relationship value.

Further, in this embodiment, step 2064, determining the category of each grid data according to the matching relationship value, includes:

determining a category of the clustering center grid data corresponding to a largest weight of the undirected edge to be the category of the grid data.

Further, in this embodiment, the higher the weight of the undirected edge between each grid data and each clustering center grid data, the higher the similarity, indicating the higher the probability that the grid data and the corresponding clustering center grid data belong to the same category. Conversely, the lower the similarity, the lower the probability that the grid data and the corresponding clustering center grid data belong to the same category. Therefore, the category of the clustering center grid data corresponding to the largest weight of the undirected edge is determined as the category of the grid data.

It can be understood that if there is no undirected edge between a grid data and a clustering center grid data, the weight of the corresponding undirected edge is zero, indicating that the grid data must not belong to the category of the clustering center grid data.

In this embodiment, since the irregular clusters can be clustered from the density peak clustering model, and the POI area is also irregular, it is more suitable for determining the POI area, and the positioning contribution relationship graph is incorporated in the calculation of the clustering parameter value of the density peak clustering model, so that the calculated clustering parameter values can truly reflect the association relationship between the user's positioning data and the grids, and the determined POI area is more accurate.

Step 207: determining at least one POI area in each block according to a clustering result.

Figure 9:
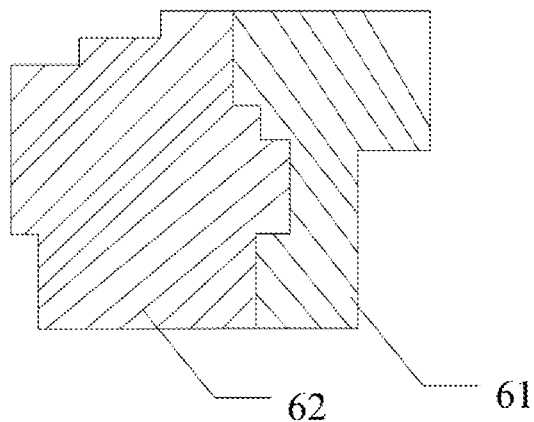
FIG. 9 is a schematic diagram of a POI area determined in the method for determining a point of interest area according to the second embodiment of the present disclosure.

Further, in this embodiment, the area where the grid data of each category in each block is located is determined to be the POI area of the corresponding category. As shown in FIG. 9, this block includes two POI areas. One is POI area 61 and the other is POI area 62.

Step 208: smoothing a boundary of the POI area.

Further, in this embodiment, as shown in FIG. 9, since the boundary of the area where the grid data of each category is located is composed of the boundaries of the outermost grid data and the grid data are rectangular, the boundary of the POI area is jagged. Therefore, in this embodiment, the boundary of the POI area is smoothed.

When the POI area is smoothed, the smoothing method may be an interpolation method, a curve fitting method, or the like, which is not limited in this embodiment.

In this embodiment, smoothing the boundary of the POI area can eliminate the sawtooth phenomenon at the boundary of the POI area.

Step 209: verifying the clustering result according to a parent point of interest and a child point of interest included in the POI area.

Further, in this embodiment, the number of parent points of interest in the POI area is determined. If the number of parent points of interest is multiple or no parent point of interest exists, it indicates that the clustering result fails to pass the verification. A prestored child point of interest corresponding to each POI can also be acquired from the POI database. Then the child points of interest included in each POI area is compared with the acquired corresponding child points of interest. If the determined child points of interest do not match the acquired child points of interest, it also indicates that the clustering result fails to pass the verification.

Step 210: if the clustering result passes the verification, outputting at least one POI area in each block; and displaying each POI area with a corresponding display strategy.

Further, in this embodiment, if the clustering result passes the verification, it indicates that the determined POI area is correct, and at least one POI area in each block is output. And in order to distinguish each POI area, each POI area is displayed with a corresponding display strategy.

In this embodiment, a display strategy of adjacent POI areas may be preset, so that the display strategies of the adjacent areas are different, so as to distinguish the adjacent POI areas.

For example, one block includes two POI areas, then the first POI area is displayed with a red background color, and the second POI area is displayed with a blue background color.

In this embodiment, after at least one POI area in a block is determined, each POI area is displayed with a corresponding display strategy, and the adjacent POI areas can be displayed distinguishingly. It is more convenient for users to check the determined POI areas.

In the method for determining a point of interest area provided by this embodiment, since the positioning contribution relationship graph can accurately reflect the association relationship between the positioning data of the user who is active in the block and the grids, the density peak clustering model is more suitable for the clustering of irregular areas, so clustering the corresponding grid data according to the positioning contribution relationship map with the density peak clustering model can accurately cluster the grids with close associations and improve the accuracy of determining the POI area.

Figure 10:
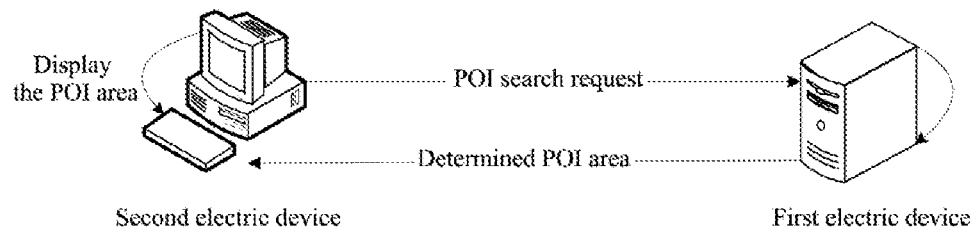
FIG. 10 is an application scenario diagram in which a method for determining a point of interest area according to an embodiment of the present disclosure can be applied.

The application scenario of the method for determining a point of interest area provided by the embodiment of the present disclosure will be described below. The method for determining a point of interest area in the embodiment of the present disclosure may be applied to a search scenario for an electronic map. As shown in FIG. 10, it is an application scenario diagram of a method for determining a point of interest area according to an embodiment of the present disclosure. The method for determining a point of interest area may be executed by a first electronic device, and the first electronic device may be a server. The first user sends a POI area search request to the server through the second electronic device, and the server determines the block in which the POI area to be searched is located according to the POI area search request, and determines the POI area to be searched in the electronic map according to the method for determining a point of interest area in the first embodiment or the second embodiment, and sends the POI area to the first electronic device, so that the first electronic device displays the POI area. After the second electronic device acquires the POI area, it can also perform navigation according to the POI area to more accurately position and determine whether it has reached the POI area.

Third Embodiment

Figure 11:
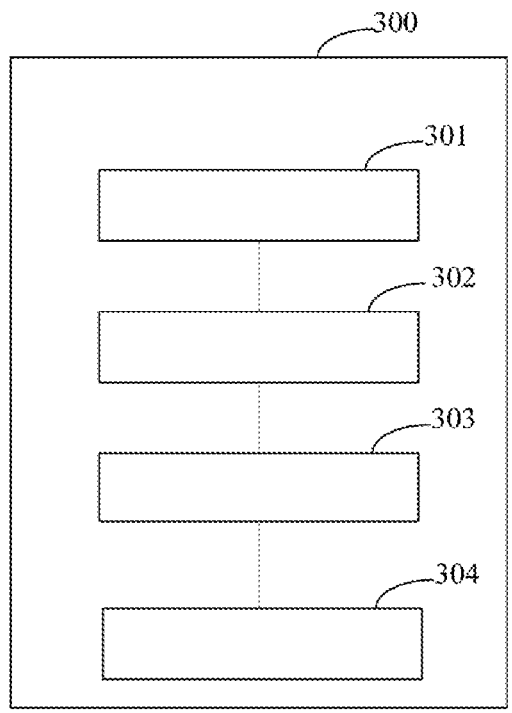
FIG. 11 is a schematic structural diagram of an apparatus for determining a point of interest area according to a third embodiment of the present disclosure.

FIG. 11 is a schematic structural diagram of an apparatus for determining a point of interest area according to the third embodiment of the present disclosure. As shown in FIG. 11, the apparatus for determining a point of interest area 300 according to this embodiment is located in an electronic device. The apparatus for determining a point of interest area 300 includes a request receiving module 301, a grid data acquiring module 302, a block clustering module 303, and a POI area determining module 304.

The request receiving module 301 is configured to receive a point of interest area determination request input by a first user, where the point of interest area determination request includes a target area coverage. The grid data acquiring module 302 is configured to acquire grid data of at least one block within the target area coverage in response to the point of interest area determination request. The block clustering module 303 is configured to acquire, for each block, positioning data of a second user within each preset time period and number of parent points of interest, and cluster corresponding grid data according to the positioning data, the grid data and the number of the parent points of interest. The POI area determining module 304 is configured to determine at least one POI area in each block according to a clustering result.

The apparatus for determining a point of interest area according to this embodiment may execute the technical solution of the method embodiment shown in FIG. 2, and the implementation principles and technical effects thereof are similar to those of the method embodiment shown in FIG. 2, and details are not described herein again.

Fourth Embodiment

Figure 12:
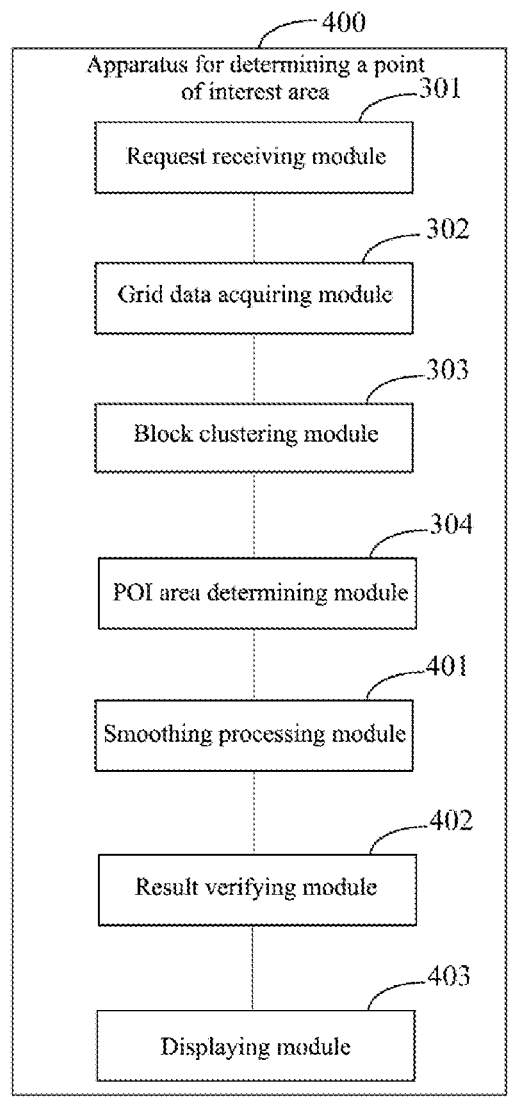
FIG. 12 is a schematic structural diagram of an apparatus for determining a point of interest area according to a fourth embodiment of the present disclosure.

FIG. 12 is a schematic structural diagram of an apparatus for determining a point of interest area according to a fourth embodiment of the present disclosure. As shown in FIG. 12, the apparatus for determining a point of interest area 400 according to this embodiment further includes the following technical solutions based on the apparatus for determining a point of interest area 300 shown in FIG. 11.

Further, the grid data obtaining module 302, while acquiring grid data of at least one block within the target area coverage, is specifically configured to acquire road data within the target area coverage; generate corresponding road network data according to the road data; determine each polygon in the road network data as each block; and perform grid division on each block to acquire the corresponding grid data.

Further, the block clustering module 303, while clustering the corresponding grid data according to the positioning data, the grid data and the number of parent points of interest, is specifically configured to generate a corresponding positioning contribution relationship graph according to the positioning data and the grid data; determine the number of parent points of interest as a corresponding number of clustering centers; and clustering the corresponding grid data according to the positioning contribution relationship graph and the number of clustering centers.

Further, when the block clustering module 303, while generating a corresponding positioning contribution relationship graph according to the positioning data and the grid data, is specifically configured to generate nodes of the corresponding positioning contribution relationship graph according to the grid data; determine whether there is an undirected edge between any two nodes according to the positioning data; if there is an undirected edge between the two nodes, then determine a weight of the undirected edge according to the positioning data; and generate the corresponding positioning contribution relationship graph according to the nodes and the weight of the undirected edge.

Further, when the block clustering module 303, while determining whether there is an undirected edge between any two nodes according to the positioning data, is specifically to, if it is determined according to the positioning data that the second user has successively visited two nodes within a preset time period, determine that there is an undirected edge between the two nodes; if it is determined according to the positioning data that the second user has not visited the two nodes successively in each preset time period, determine that there is no undirected edge between the two nodes.

Further, the block clustering module 303, while determining the weight of the undirected edge according to the positioning data, is specifically configured to determine the weight of the undirected edge according to the frequency of successively visiting the two nodes in each preset time period; wherein the frequency has a positive correlation with the weight of the undirected edge.

Further, the block clustering module 303, while clustering the corresponding grid data according to the positioning contribution relationship graph and the number of clustering centers, is specifically configured to determine at least one clustering parameter value of each grid data in a preset clustering model according to the positioning contribution relationship graph; filter out clustering center grid data from the grid data according to the clustering parameter value, the number of the clustering center grid data is the same as the number of the clustering centers; determine a matching relationship value between each grid data and each clustering center grid data; and determine a category of each grid data according to the matching relationship value.

Further, the preset clustering model is a density peak clustering model. Correspondingly, the block clustering module 303, while determining at least one clustering parameter value of each grid data in a preset clustering model according to the positioning contribution relationship graph, is specifically configured to determine a first clustering parameter value of grid data of a starting point of the undirected edge according to the weight of the undirected edge in the positioning contribution relationship graph and the distance between two nodes corresponding to the undirected edge; and determine a second clustering parameter value of grid data corresponding to the node according to a distance between each node and a corresponding preset high-density node in the positioning contribution relationship graph.

Further, the block clustering module 303, when filtering out clustering center grid data from the grid data according to the clustering parameter value, is specifically configured to rank the grid data according to the first clustering parameter value and the second clustering parameter value respectively; acquire first M grid data whose the first clustering parameter value and the second clustering parameter value are both ranked in the first M; filter out N grid data from the first M grid data according to the product value of the first cluster parameter value and the second cluster parameter value; and determine the N grid data to be the clustering center grid data.

Further, the matching relationship value is a weight of a corresponding undirected edge. The block clustering module 303, while determining the category of each grid data according to the matching relationship value, is specifically configured to determine a category of the clustering center grid data corresponding to a largest weight of an undirected edge to be the category of the grid data.

Further, the POI area determining module 304 is specifically configured to determine the area where the grid data of each category in each block is located to be the POI area of the corresponding category.

Further, the apparatus for determining a point of interest area according to this embodiment further includes a smoothing processing module 401 configured to smooth a boundary of the POI area.

Further, the apparatus for determining a point of interest area according to this embodiment further includes a result verifying module 402 configured to verify the clustering result according to a parent point of interest and a child point of interest included in the POI area.

Further, the apparatus for determining a point of interest area according to this embodiment further includes: a displaying module 403 configured to output at least one POI area in each block if the clustering result passes the verification; and display each POI area with a corresponding display strategy.

The apparatus for determining a point of interest area according to this embodiment may execute the technical solutions of the method embodiments shown in FIG. 3 to FIG. 4 and FIG. 6 to FIG. 8. The implementation principles and technical effects are similar to the method embodiments shown in FIG. 3 to FIG. 4 and FIG. 6 to FIG. 8. and will not be described in detail here.

According to the embodiments of the present disclosure, the present disclosure further provides an electronic device and a readable storage medium.

Figure 13:
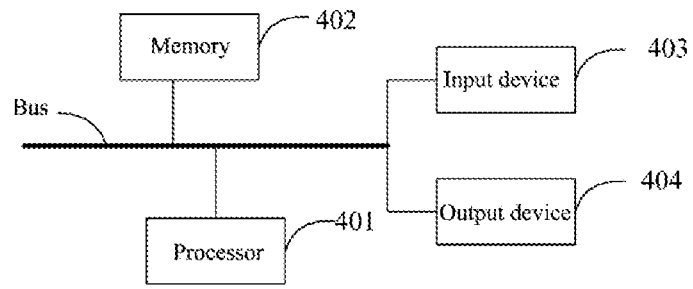
FIG. 13 is a block diagram of an electronic device used to implement the method for determining a point of interest area according to an embodiment of the present disclosure.

As shown in FIG. 13, it is a block diagram of an electronic device of a method for determining a point of interest area according to an embodiment of the present disclosure. The electronic device is intended for various forms of digital computers, such as laptops, desktops, workstations, personal digital assistants, servers, blade servers, mainframes, and other appropriate computers. The electronic device may also represent various forms of mobile devices, such as personal digital assistants, cellular telephones, smartphones, wearable devices and other similar computing devices. The components shown here, their connections and relationships, and their functions, are meant to be exemplary only, and are not meant to limit implementations of the inventions described and/or claimed in this document.

As shown in FIG. 13, the electronic device includes: one or more processors 401, a memory 402, and interfaces for connecting various components, including a high-speed interface and a low-speed interface. The various components are interconnected using different buses and can be mounted on a common motherboard or in other manners as required. The processor may process may process instructions for execution within the computing device, including instructions stored in the memory or on the storage device to display graphical information for a GUI on an external input/output device, such as a display coupled to an interface. In other implementations, multiple processors and/or multiple buses may be used, as appropriate, along with multiple memories and types of memory. Also, multiple electrical devices may be connected, with each device providing portions of the necessary operations (e.g., as a server bank, a group of blade servers, or a multi-processor system). One processor 401 is taken as an example in FIG. 13.

The memory 402 is a non-transitory computer-readable storage medium according to the present disclosure. The memory stores instructions executable by at least one processor, so that the at least one processor executes the method of determining a point of interest area according to the present disclosure. The non-transitory computer-readable storage medium of the present disclosure stores computer instructions, which are used to cause a computer to execute the method of determining a point of interest area according to the present disclosure.

As a non-transitory computer-readable storage medium, the memory 402 can be used to store non-transitory software programs, non-transitory computer executable programs and modules, such as program instructions/modules (for example, the request receiving module 301, the grid data acquiring module 302, the block clustering module 303, and the POI area determining module 304 shown in FIG. 11) corresponding to the method of determining a point of interest area in the embodiment of the present disclosure. The processor 401 executes various functional applications and data processing of the server by running the non-transitory software programs, instructions, and modules stored in the memory 402, that is, implementing the method of determining a point of interest area in the above method embodiment.

The memory 402 may include a program storing area and a data storing area, where the program storing area may store an operating system and at least one application program required for the function; and the data storing area may store data created by the use of the electronic device of FIG. 13, etc. In addition, the memory 402 may include a high-speed random access memory, and may also include a non-transitory memory, such as at least one disk storage device, a flash memory device, or other non-transitory solid-state storage device. In some embodiments, the memory 402 may optionally include memories remotely disposed with respect to the processor 401, and these remote memories may be connected to the electronic device of FIG. 13 through a network. Examples of the above network include, but are not limited to, the Internet, an intranet, a local area network, a mobile communication network, and combinations thereof.

The electronic device of FIG. 13 may further include an input device 403 and an output device 404. The processor 401, the memory 402, the input device 403, and the output device 404 may be connected through a bus or in other manners. In FIG. 13, connection through a bus is taken as an example.

The input device 403 may receive input voice, number, or character information, and generate key signal inputs related to user settings and function control of the electronic device of FIG. 13, such as a touch screen, a keypad, a mouse, a trackpad, and a touchpad, a pointing stick, one or more mouse buttons, trackball, joystick and other input devices. The output device 404 may include a voice playback device, a display device, an auxiliary lighting device (for example, an LED), a haptic feedback device (for example, a vibration motor), and the like. The display device may include, but is not limited to, a liquid crystal display (LCD), a light emitting diode (LED) display, and a plasma display. In some embodiments, the display device may be a touch screen.

Various implementations of the systems and techniques described here may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, and may receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the terms "machine-readable medium" and "computer-readable medium" refers to any computer program product, device and/or apparatus (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The systems and techniques described here may be implemented in a computing system (e.g., as a data server) that includes a back end component, or a computing system (e.g., an application server) that includes a middleware component, or a computing system (e.g., a client computer having a graphical user interface or a Web browser through which a user may interact with an implementation of the systems and techniques described here) that includes a front end component, or a computing system that includes any combination of such back end, middleware, or front end components. The components of the system may be interconnected by any form or medium of digital data communication (e.g., a communication network). Examples of communication networks include a local area network ("LAN"), a wide area network ("WAN"), and the Internet.

The computing system may include a client and a server. The client and server are generally remote from each other and typically interact through a communication network. The relationship of client and server arises by virtue of computer programs running on the respective computers and having a client-server relationship to each other.

According to the technical solutions of the embodiment of the present disclosure, since the grid of each block can be clustered according to the association relationship between the positioning data of the user who is active in the block and the grid, the positioning data of the user can closely associate grids in one POI area, so clustering grids with close associations together can determine a corresponding POI area without manual determination, which reduces the cost and improves the efficiency of determining a POI area.

It should be understood that various forms of the flows shown above may be used, with steps re-ordered, added, or removed. For example, the steps described in the present disclosure can be performed in parallel, sequentially, or in different orders. As long as the desired results of the technical solutions disclosed in the present disclosure can be achieved, and it is not limited herein.

The foregoing specific implementation do not constitute a limitation on the protection scope of the present disclosure. It should be understood by those skilled in the art that various modifications, combinations, sub-combinations, and substitutions can be made according to design requirements and other factors. Any modification, equivalent replacement and improvement made within the spirit and principle of the present disclosure shall be included in the protection scope of the present disclosure.

What is claimed is:

1. A method for determining a point of interest area, wherein the method is applied to an electronic device, and the method comprises:
   receiving a point of interest area determination request input by a first user, the point of interest area determination request comprising a target area coverage;
   acquiring grid data of at least one block within the target area coverage in response to the point of interest area determination request, wherein each of the at least one block is divided uniformly into grids and grid data of the each of the at least one block is constructed from position coordinates of each grid;
   acquiring, for each block, positioning data of a second user within each of a plurality of preset time periods and a number of parent points of interest; clustering corresponding grid data according to the positioning data, the grid data and the number of the parent points of interest; and
   determining at least one POI area in each block according to a clustering result;
   wherein the clustering the corresponding grid data according to the positioning data, the grid data and the number of parent points of interest comprises:
   generating a corresponding positioning contribution relationship graph according to the positioning data and the grid data;
   determining the number of parent points of interest to be corresponding number of clustering centers; and
   clustering the corresponding grid data according to the positioning contribution relationship graph and the number of clustering centers;
   wherein the generating a corresponding positioning contribution relationship graph according to the positioning data and the grid data comprises:
   generating nodes of the corresponding positioning contribution relationship graph according to the grid data;
   determining whether there is an undirected edge between any two nodes according to the positioning data;
   when there is an undirected edge between two nodes, determining a weight of the undirected edge according to the positioning data; and
   generating the corresponding positioning contribution relationship graph according to the nodes and the weight of the undirected edge.

2. The method according to claim 1, wherein the acquiring grid data of at least one block within the target area coverage comprises:
   acquiring road data within the target area coverage;
   generating corresponding road network data according to the road data;
   determining each polygon in the road network data as each block;
   performing grid division on the each block to acquire the corresponding grid data.

3. The method according to claim 1, wherein the determining whether there is an undirected edge between any two nodes according to the positioning data comprises:
   when it is determined according to the positioning data that the second user has successively visited two nodes within a preset time period, determining that there is an undirected edge between the two nodes;
   when it is determined according to the positioning data that the second user has when it is determined according to the positioning data that the second user has not visited the two nodes successively in each preset time period, determining that there is no undirected edge between the two nodes.

4. The method according to claim 3, wherein the determining the weight of the undirected edge according to the positioning data comprises:
   determining the weight of the undirected edge according to a frequency of successively visiting the two nodes in each preset time period;
   wherein the frequency has a positive correlation with the weight of the undirected edge.

5. The method according to claim 4, wherein the clustering the corresponding grid data according to the positioning contribution relationship graph and the number of clustering centers comprises:
   determining at least one clustering parameter value of each grid data in a preset clustering model according to the positioning contribution relationship graph;
   filtering out clustering center grid data from the grid data according to the clustering parameter value, wherein number of the clustering center grid data is the same as number of the clustering centers;

determining a matching relationship value between each grid data and each clustering center grid data; and determining a category of each grid data according to the matching relationship value.

6. The method according to claim 5, wherein the preset clustering model is a density peak clustering model;

the determining at least one clustering parameter value of each grid data in a preset clustering model according to the positioning contribution relationship graph comprises:

determining a first clustering parameter value of grid data of a starting point of the undirected edge according to the weight of the undirected edge in the positioning contribution relationship graph and a distance between the two nodes corresponding to the undirected edge; and according to a distance between each node and a corresponding preset high-density node in the positioning contribution relationship graph, determining a second clustering parameter value of grid data corresponding to the node.

7. The method according to claim 5, wherein the filtering out clustering center grid data from the grid data according to the clustering parameter value comprises:

ranking the grid data according to a first clustering parameter value and a second clustering parameter value respectively;

acquiring first M grid data whose the first clustering parameter value and the second clustering parameter value are both ranked in the first M;

filtering out N grid data from the first M grid data according to a product value of the first cluster parameter value and the second cluster parameter value; and determining the N grid data to be the clustering center grid data.

8. The method according to claim 6, wherein the matching relationship value is a weight of a corresponding undirected edge;

the determining the category of each grid data according to the matching relationship value comprises:

determining a category of the clustering center grid data corresponding to a largest weight of the undirected edge to be the category of the grid data.

9. The method according to claim 1, wherein the determining at least one POI area in each block according to a clustering result comprises:

determining the area where the grid data of each category in each block is located to be the POI area of the corresponding category.

10. The method according to claim 1, wherein after determining at least one POI area in each block according to the clustering result, the method further comprises:

verifying the clustering result according to a parent point of interest and a child point of interest comprised in the POI area.

11. The method according to claim 1, wherein after determining at least one POI area in each block according to the clustering result, the method further comprises:

smoothing a boundary of the POI area.

12. The method according to claim 10, wherein after verifying the clustering result according to the parent point of interest and the child point of interest comprised in the POI area, the method further comprises:

if the clustering result passes the verification, outputting at least one POI area in each block; and displaying each POI area with a corresponding display strategy.

13. An apparatus for determining a point of interest area, where the apparatus is in an electronic device, and the apparatus comprises at least one processor; and a memory communicatively connected to the at least one processor; wherein, the memory stores instructions executable by the at least one processor, and the instructions are executed by the at least one processor to enable the at least one processor to:

receive a point of interest area determination request input by a first user, the point of interest area determination request comprising a target area coverage;

acquire grid data of at least one block within the target area coverage in response to the point of interest area determination request, wherein each of the at least one block is divided uniformly into grids and grid data of the each of the at least one block is constructed from position coordinates of each grid;

acquire, for each block, positioning data of a second user within each of a plurality of preset time periods and a number of parent points of interest, and cluster corresponding grid data according to the positioning data, the grid data and the number of the parent points of interest; and determine at least one POI area in each block according to a clustering result;

wherein, the instructions are executed by the at least one processor to further enable the at least one processor to:

generate a corresponding positioning contribution relationship graph according to the positioning data and the grid data; determine the number of parent points of interest to be a corresponding number of clustering centers; and cluster the corresponding grid data according to the positioning contribution relationship graph and the number of clustering centers;

wherein, the instructions are executed by the at least one processor to further enable the at least one processor to:

generate nodes of a corresponding positioning contribution relationship graph according to the grid data; determine whether there is an undirected edge between any two nodes according to the positioning data; if there is an undirected edge between two nodes, determine a weight of the undirected edge according to the positioning data; and generate the corresponding positioning contribution relationship graph according to the nodes and the weight of the undirected edge.

14. The apparatus according to claim 13, wherein, the instructions are executed by the at least one processor to further enable the at least one processor to:

acquire road data within the target area; generate corresponding road network data according to the road data; determine each polygon in the road network data as each block; and perform grid division on the each block to acquire the corresponding grid data.

15. A non-transitory computer-readable storage medium storing computer instructions, wherein the computer instructions are configured to cause a computer to execute the method according to claim 1.

16. A method for determining a point of interest area, comprising:

acquiring grid data of at least one block within a target area coverage, wherein each of the at least one block is divided uniformly into grids and grid data of the each of the at least one block is constructed from position coordinates of each grid;

acquiring, for each block, positioning data of a second user within each of a plurality of preset time periods and a number of parent points of interest; clustering corresponding grid data according to the positioning data, the grid data and the number of the parent points of interest; and determining at least one POI area in each block according to a clustering result;

wherein the clustering the corresponding grid data according to the positioning data, the grid data and the number of parent points of interest comprises:

generating a corresponding positioning contribution relationship graph according to the positioning data and the grid data;

determining the number of parent points of interest to be corresponding number of clustering centers; and clustering the corresponding grid data according to the positioning contribution relationship graph and the number of clustering centers;

wherein the generating a corresponding positioning contribution relationship graph according to the positioning data and the grid data comprises:

generating nodes of the corresponding positioning contribution relationship graph according to the grid data;

determining whether there is an undirected edge between any two nodes according to the positioning data;

when there is an undirected edge between two nodes, determining a weight of the undirected edge according to the positioning data; and generating the corresponding positioning contribution relationship graph according to the nodes and the weight of the undirected edge.

* * * * *